Patented Aug. 5, 1941

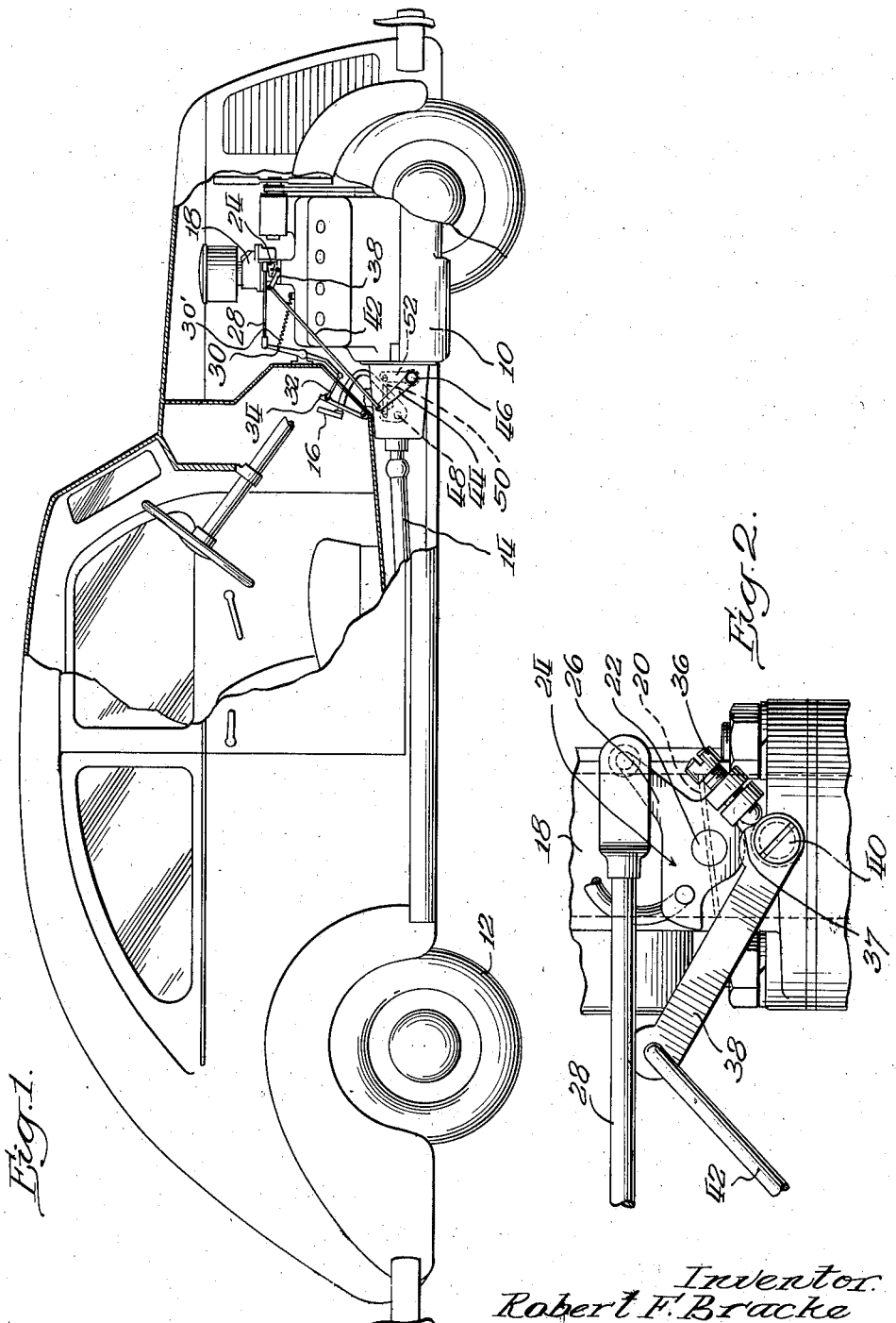

2,251,350

UNITED STATES PATENT OFFICE 2,251,350

THROTTLE VALVE CONTROL MECHANISM

Robert F. Bracke, Chicago, Ill.

Application August 10, 1938, Serial No. 224,047

4 Claims. (Cl. 192—.01)

My invention relates to throttle valve control mechanism and is more particularly concerned with mechanism for controlling the throttle valves of carburetors used on automobiles and similar vehicles.

In present day automotive practice, it is quite common for the automobile engine to stall when the throttle valve of the carburetor is suddenly closed and the clutch pedal is simultaneously operated to disconnect the motor from the driving wheels of the automobile. Such stalling is due to the presence in the manifold of a richer mixture than the automobile engine is capable of taking care of at the ordinary idling speed.

In the past, attempts have been made to avoid this difficulty by the adoption of various expedients. One such expedient consisted in the provision of a dashpot which functioned to delay closing of the carburetor throttle valve when pressure is suddenly released on the usual manual or foot control, whereby the throttle valve is held open against the tension of the spring tending to close this valve. This dashpot arrangement was unsatisfactory due to variation in the tension in the throttle valve springs and also because the action of the dashpot in delaying the closing of the throttle valve prevented the engine from being used as a satisfactory braking means for retarding the forward movement of the vehicle when the operator desired to obtain such a braking action. In other words, an automobile in which the carburetor throttle valve was provided with such a dashpot, acted like a free-wheeling device in this respect.

Another expedient heretofore adopted was the provision of an inertia weight which moved forward upon the sudden stopping of the automobile, the forward motion of the inertia weight being utilized to oppose the spring tending to close the throttle valve in such manner that the closing of the throttle valve was delayed. This expedient had the further objection that it was ineffective when the car was moving slowly, as, for example, when the car is climbing a hill slowly and it is found necessary to stop the automobile on the incline. Under such conditions the inertia weight was ineffective to prevent stalling of the engine.

An object of my invention is to provide an improved throttle valve control mechanism which will prevent stalling of the automobile engine when pressure is released from the usual manual and foot control mechanisms, and when the automobile engine is simultaneously disconnected from the driving wheels of the automobile.

Another object of my invention is to provide means for accomplishing the foregoing object without interfering with the use of the automobile engine as a brake.

Another object of my invention is to provide improved means for accomplishing the foregoing objects which will be free from the disadvantages of the prior art.

Other objects and advantages will become apparent as the description proceeds.

In the drawing,

Figure 1 is a side elevational view of an automobile with parts cut away to show my improved throttle valve control mechanism; and Figure 2 is a detailed view showing certain parts of my improved mechanism on a larger scale than Figure 1.

Referring to the drawing, in Figure 1 I have illustrated a conventional Ford V-8 automobile having an engine 10 located at the forward end of the automobile and connected to the rear wheels 12 through a drive shaft 14. A clutch (not shown) is interposed between the engine 10 and drive shaft 14 whereby the engine may be connected to or disconnected from the drive shaft and rear wheels. This clutch is controlled by the usual clutch pedal 16.

The engine 10 is illustrated as being provided with a carburetor 18 having a throttle valve 20 (Figure 2) mounted on a shaft 22. A lever 24 is attached to one end of the shaft 22 and has an arm 26 connected by link 28, lever 30, and link 32 to the accelerator pedal 34. It will be understood that the throttle valve 20 is also connected to the usual hand control (not shown). The throttle valve is urged to closed position as by a tension spring 30' connected to the lever 30.

The lever 24 has a second arm carrying an adjustable screw 36 which in the conventional automobile engages a fixed stop projecting from the side of the carburetor, whereby the idling position of the throttle valve is determined.

In my invention the adjusting screw 36 engages the cam surface 37 provided on the adjacent end of a lever 38 pivotally mounted as indicated at 40 and connected by link 42 to an arm 44 attached to the clutch throwing-out shaft 46. The clutch pedal 16 is pivoted as indicated at 48 and is connected to the clutch throw-out shaft 46 by way of link 50 and arm 52 so that a relatively large movement of the clutch pedal 16 produces a relatively small movement of the clutch throw-out shaft 46.

From the foregoing it will be seen that whereas in the prior art the stop position of the carburetor throttle valve was the same for all conditions of engine operation, this is not true of my improved throttle valve control mechanism. With my throttle valve control mechanism the stop position of the throttle valve varies according to the position of the clutch pedal 16. When the clutch pedal is in elevated position and the clutch is engaged, the stop position of the throttle valve is the same as that currently used in present practice and provides the conventional idling speed of the automobile engine. On the other hand, when the clutch pedal is depressed just enough to disconnect the engine from the drive shaft 14, a higher part of the cam surface 37 is positioned to engage the adjusting screw 36 and the stop position of the throttle valve provides an engine speed materially higher than the normal engine speed. I have found that excellent results obtain where this stop position provides an engine speed corresponding to a road speed in high gear of approximately twelve miles per hour.

When the clutch pedal is fully depressed, such as is ordinarily necessary for changing gears, a still higher part of the cam surface 37 is positioned to engage the adjusting screw 36. I have obtained excellent results where this stop position provides an engine speed corresponding to a road speed in high gear of approximately fifteen miles per hour.

In automobile operation it is common to operate the automobile with the accelerator pedal partly or completely depressed and to suddenly release the accelerator pedal, disengage the clutch and apply the brake. In the conventional automobile the throttle valve immediately closes to idling position as soon as the accelerator pedal is released, whereupon the rich mixture present in the intake manifold chokes and stalls the engine. With my invention, on the other hand, a movement of the clutch pedal sufficient to disengage the clutch prevents the throttle valve from closing to idling position and holds this throttle valve open in position corresponding to a road speed in high gear of approximately twelve miles per hour. I have found that under most conditions of automobile operation, this will prevent stalling of the automobile engine.

Where an automobile is being driven up a steep hill and is brought to a sudden stop, the intake manifold of the engine contains an extremely rich mixture at the instant the accelerator pedal is released and under this condition of operation I find it desirable to advance the stop position of the throttle valve to a position corresponding to a road speed in high gear of fifteen miles per hour. Where the automobile is stopped on an up-grade, it is ordinarily necessary to shift gears and under these conditions it is necessary to depress the clutch pedal fully, whereupon the cam surface 37 is shifted so that a still higher portion of this cam surface is positioned to contact with the adjusting screw 36. This feature is particularly desirable in making a hill stop on a hot day.

It will be understood that the screw 36 may be rotated in either direction to vary the normal idling speed of the engine as desired. Such variation in idling speed will necessarily vary the stop positions of the throttle valve for partial and complete depressions of the clutch pedal.

As a result of extensive tests under actual operating conditions, I have found that an automobile equipped with my invention provides better gasoline economy in traffic than does the same automobile not so equipped. This is due to the fact that with the conventional automobile engine, operating at idling speed while the vehicle is stopped at a traffic light or for other reasons, it is necessary to accelerate the engine materially before engaging the clutch, and most people waste gasoline by accelerating the engine to a greater degree than is necessary. Under similar conditions, the engine of an automobile equipped with my invention rotates at a speed corresponding to a road speed of twelve or fifteen miles an hour, depending upon whether the clutch is partially or completely depressed, and with either of these speeds and engine rotation, it is usually unnecessary to further accelerate the engine upon re-engagement of the clutch. My tests indicate that the extra gasoline consumed by the higher rotative speed of the automobile engine, while the vehicle is stationary, is more than offset by the saving effected by eliminating the engine acceleration heretofore necessary before the clutch can be re-engaged.

While my invention is particularly applicable to automobiles, it may also be applied to tractors and other automotive vehicles in which the power developed by the motor is transmitted to endless tracks or other driving members in lieu of the wheels 12. In the claims I have used the words "driving member" to indicate either a driving wheel, an endless track, or equivalent means.

While I have illustrated and described only a single embodiment of my invention, it is to be understood that my invention is not limited to the details shown, but that the scope of my invention is limited solely by the following claims.

I claim:

1. In an automotive vehicle having an engine, a driving member and a clutch having three distinct positions and interposed between said engine and member, said three distinct positions being the engaged position, intermediate disengaged position, and fully disengaged position, the combination of a throttle valve for regulating the operation of said engine, means for opening said throttle valve, means for closing said throttle valve, a cam for variably limiting closing movement of said throttle valve, and a connection between said cam and clutch, said cam providing a different limit for closing movement of said throttle valve for each of said clutch positions, the limit permitting maximum closing movement of said throttle valve corresponding to normal idling operation of said engine.

2. In an automotive vehicle having an engine provided with a throttle valve, a driving member, and a clutch interposed between the engine and driving member, the combination of means for opening said throttle valve, means for closing said valve, a pedal for controlling said clutch, and linkage connected to said clutch and variably limiting closing movement of said throttle valve, said linkage permitting the greatest closing movement of said throttle valve when said clutch is engaged, a lesser closing movement when said clutch is in intermediate, engaged position, and the least closing movement when said clutch is fully disengaged, the greatest closing movement of said throttle valve corresponding to normal idling operation of said engine.

3. In an automotive vehicle having an engine provided with a throttle valve urged toward closed position, a driving member and a clutch interposed between the engine and driving member, the combination of means for opening said throttle valve, means effective under all conditions to limit closing of said throttle valve to a position corresponding to idling operation of said engine, and means effective upon disengagement of said clutch to advance the closing limit of said throttle valve whereby said engine is always provided with a greater amount of fuel than required for normal idling operation when said clutch is disengaged.

4. In an automotive vehicle having an engine provided with a throttle valve urged toward closed position, a driving member and a clutch interposed between the engine and driving member, the combination of means for opening said throttle valve, means effective under all conditions to limit closing of said throttle valve to a position corresponding to idling operation of said engine, means effective upon initial disengagement of said clutch to advance the closing limit of said throttle valve, and means effective upon further disengaging movement of said clutch further to advance the closing limit of said throttle valve, said last two named means being effective to provide said engine with a greater amount of fuel than required for normal idling operation whenever said clutch is disengaged.

ROBERT F. BRACKE.